March 14, 1961 R. A. COOLEY 2,974,484
IGNITION SYSTEM FOR ROCKET MOTORS
Filed Jan. 23, 1952
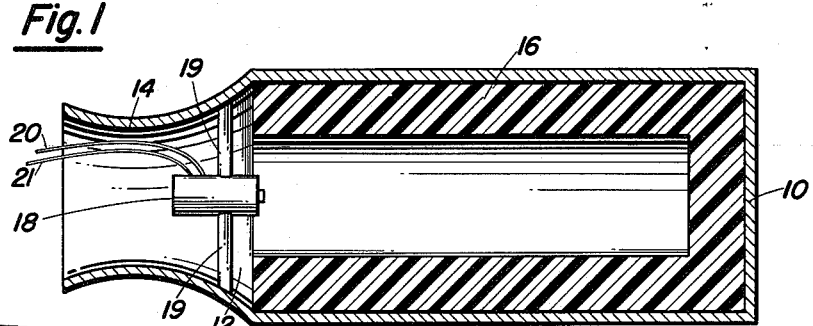
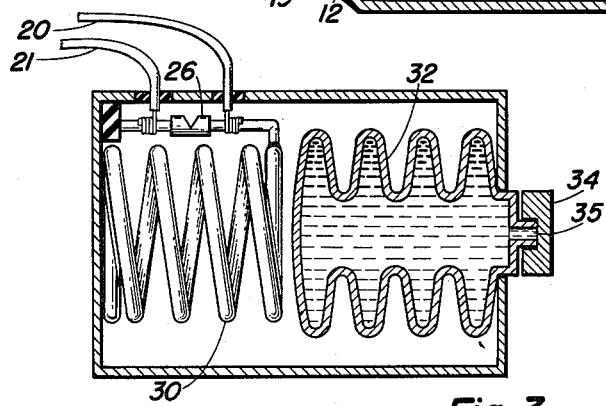
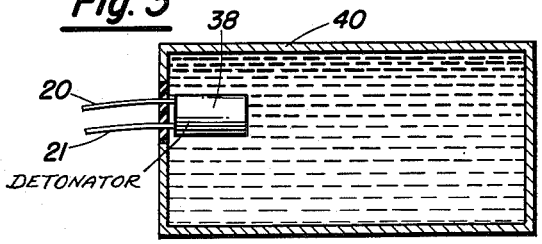
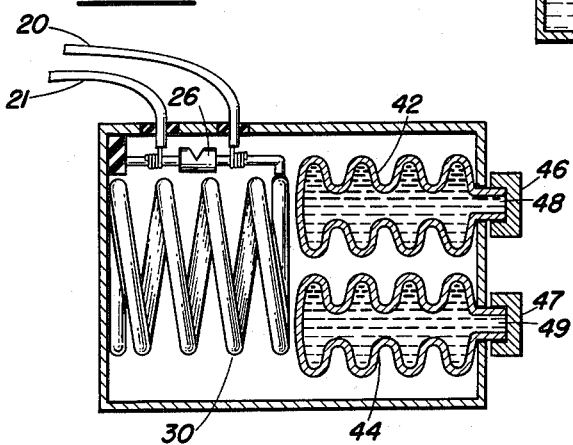
INVENTOR.
ROBERT A. COOLEY
Attorneys

United States Patent Office 2,974,484
Patented Mar. 14, 1961

2,974,484
IGNITION SYSTEM FOR ROCKET MOTORS
Robert A. Cooley, 17 Green Acres, Rolla, Mo.
Filed Jan. 23, 1952, Ser. No. 267,901
6 Claims. (Cl. 60—39.47)
(Granted under Title 35, U.S. Code (1952), sec. 266)

The invention described herein may be manufactured and used by or for the Government of the United States of America for governmental purposes without the payment of any royalties thereon or therefor.

This invention relates to rocket motors, particularly to igniters, and especially to igniters including a confined fluid which, when released, ignites the propellant by reacting chemically with the propellant.

In rocket motors, it is important that ignition of the propellant take place with certainty and with minimum disruption of the propelling charge. Black powder and a few mixtures that behave much like black powder are commonly used in the form of squibs as igniters. These igniters have disadvantages, many of which are especially pronounced at low temperatures. The detonation wave associated with black powder tends to fracture and disrupt the propellant which becomes more brittle as the temperature is lowered. Temperature changes affect the ignition performance of black powder since the effective action of powder consists of raising the temperature of the propellant surface to the auto-ignition point by conduction, convection and radiation of heat. Ignited black powder quickly reaches a peak of activity with the evolution of much gas and then quickly subsides. The resulting sudden, short lived, relatively large impulse is not conducive to good performance in a rocket, for example, where a gradual start is desired with a smooth build-up of pressure. The temporary thrust produced by burning powder influences the ballistic charcteristics of the rocket during the initial part of the flight. Black powder is also subject to variations in performance since its burning properties depend on ingredient proportions, adequacy of mixing, and particle size.

In the instant invention, the active agent of the igniter is a fluid which is inert when confined but is capable when released of interacting chemically with the propellant or with air adjacent to the propellant thus bringing about ignition. When a strongly oxidizing fluid contacts rocket propellant, a vigorous reaction takes place with evolution of much energy. This energy is utilized to bring the propellant quickly to effective operating condition.

The invention also comprises a method of utilizing chemical energy in the manner indicated to initiate ignition of a propulsive charge.

An object of the invention is to provide an improved method and apparatus wherein chemical energy is utilized for smoothly and quickly initiating the firing of a rocket motor at low, medium or high temperatures.

Other objects and many of the attendant advantages of this invention will be readily appreciated as the same becomes better understood by reference to the following description.

Fig. 1 is a diagrammatic view showing the igniter in relation to the elements with which it is used;
Fig. 2 is an enlarged view of an igniter embodying the invention;
Fig. 3 is a view of a modified form of the invention; and
Fig. 4 is a view of another modified form.

There is shown in Fig. 1 in assembled relation a rocket motor including an igniter embodying this invention. The rocket motor comprises a cylindrical housing 10 defining a combustion chamber 12. The rear end of housing 10 is shaped to define a constricted discharge passage 14. A propellant charge 16 is positioned within combustion chamber 12.

In accordance with this invention a rupturable, closed container 18 of initiating fluid is mounted by suitable means 19 at the open end of the propellant charge 16. Electrical current is supplied to the container 18 through leads 20 and 21.

Means to release the contained fluid may take various forms. As indicated in Fig. 2, the release mechanism may consist of a fusible link 26 through which a current can pass via the leads 20 and 21. While the link is intact it restrains the compressed spring 30. When the spring is released it presses against the bellows-like fluid holder 32. The plug 34 is arranged to be forced away from the outlet 35 at a predetermined pressure.

As noted above, the fluid in the igniter should be inactive when held within the container yet capable of uniting exothermically with the propellant when the fluid is released. A large number of materials meet these requirements. A gas such as fluorine or such liquids as bromine trifluoride, chlorine trifluoride or fluorine nitrate will act as very effective igniters. The reaction takes place on and with the propellant, and the energy available for ignition purposes depends on the rate of the heterogeneous chemical reaction. It will be evident that there is no problem of transferring heat from the separate igniter to the surface of the propellant. A pure single compound or element may be used thus assuring uniformity of performance. The fluid ignites the propellant quickly without formation of the detonation wave or shock associated with the black powder igniter. The fluid container must be formed of a substance such as Teflon or stainless metal alloy resistant to the action of the particular fluid used.

If it is not desired to have an oxidizing reaction with the propellant as one reactant, the fluid selected may be a compound that ignites on exposure to air. Typical compounds suitable for use in the invention include zinc dimethyl, zinc diethyl, aluminum trimethyl, and aluminum triethyl to be used either singly or in combination. When released in a rocket motor, the fluid is distributed over a large area of the propellant without detonation or other shock. The fluid bursts into flame as soon as it contacts the air, and ignites the propellant.

In the operation of the form of invention thus far described, an electrical current passing through the link 26 causes it to melt thereby releasing the compressed spring 30. As the spring moves forward pressing against the bellows containing the fluid, a pressure is created within the bellows which pushes plug 34 outwardly. The fluid is forced through the aperture 35 with turbulence, and it contacts a large area of propellant within a short time. The resulting chemical reaction initiates propellant ignition. The mounting brackets 19 in Fig. 1 which secure the igniter prior to firing give way as the propellant burns allowing the spent igniter to be carried out of the combustion area.

In the form of the invention shown in Fig. 3, the container is ruptured and the fluid is distributed over the surface of the propellant by means of the small detonator 38. In the operation of this embodiment of the invention, a source of electrical current is connected to leads 20 and 21 to bring about a small explosion within the container 40. The confined detonator produces sufficient force to tear openings in the container and eject the fluid but not enough force to disturb the propellant grain or to modify the flight characteristics of the rocket motor.

In the form of the invention shown in Fig. 4, two containers 42 and 44 are arranged so their contents will be discharged simultaneously. The two fluids are mixed and distributed as they issue from the container, and the reaction between them starts immediately. Nitrogen dioxide and aniline form a suitable pair of fluids. The intensity of the reaction and accompanying evolution of heat ignite the propellant. It will be evident that other liquid pairs may be utilized to obtain optimum temperatures and gas formation for any given application. The release mechanism and the fluid containers shown are substantially the same as the corresponding parts in Fig. 2. As the link 26 melts, the compressive force of spring 30 upon the containers 42, 44 forces the plugs 46 and 47 from the two openings 48 and 49 and ejects the fluids. The fluids react as they mix and are deposited on the surface of the propellant where they cause ignition.

Obviously many modifications and variations of the present invention are possible in the light of the above teachings. It is therefore to be understood that within the scope of the appended claims the invention may be practiced otherwise than as specifically described.

What is claimed is:

1. In a rocket motor, a solid propellant, a strongly oxidizing fluid reagent, means effective to maintain said reagent apart from said propellant, and means effective to bring said reagent into close contact with said propellant whereby the resulting exothermic reaction initiates ignition of said propellant.

2. In an igniter, an outer shell, a collapsible container mounted within said shell and having an opening to the outside of said shell, a releasable plug effective to seal said opening in said container at pressures below a predetermined level, a reactive fluid confined in said container, a normally compressed spring mounted within said outer shell and effective when released from compression to collapse said container whereby said plug is forced from the opening in said container and said fluid is ejected outside of said outer shell, a fusible link effective to maintain said spring in compression, and connecting means effective to connect a source of electrical current across said link.

3. In a rocket motor, a solid propellant, a collapsible container having an outlet port directed toward said propellant, collapsing means effective to collapse said container and produce a high pressure therein, sealing means for said outlet port releasable upon rise of pressure within the container to a predetermined value, a propellent reactive fuel confined in said container by said sealing means, restraining means effective to maintain said collapsing means inoperative, and trigger means effective to release said collapsing means to increase the pressure within said container to said predetermined value.

4. In a rocket motor including a solid propellant, an igniter for said propellant comprising a container for strongly oxidizing fluid having an outlet and a relatively movable wall for applying pressure to said fluid, a closure for said outlet releasable upon rise of said pressure to a predetermined value, means for moving said wall to raise said pressure to said value, means for maintaining said moving means inoperative, and electrical means for releasing said maintaining means.

5. In an igniter, an outer shell, a first collapsible container mounted within said shell and having an opening to the outside of said outer shell, a first releasable plug effective to seal said opening in said container at pressures below a predetermined level, a first fluid confined in said first container, a second similar container, a second similar releasable plug, a second fluid confined in said second container and hypergolic with said first fluid, a normally compressed spring mounted within said outer shell and effective when released from compression to collapse said first and second containers whereby said first and second plugs are forced from the openings in said container and said hypergolic fluids are mixed outside of said outer shell, a fusible plug effective to maintain said spring in compression, and connecting means effective to connect a source of electrical current across said link.

6. In a rocket motor, a solid propellant, a closed fluid container positioned adjacent said propellant, a strongly oxidizing fluid confined within said container, and a detonator disposed within said container having sufficient energy when detonated to disrupt said container and eject said fluid upon said propellant whereby ignition thereof is initiated.

References Cited in the file of this patent

UNITED STATES PATENTS

| | | |
|---|---|---|
| 2,434,652 | Hickman | Jan. 20, 1948 |
| 2,500,334 | Zucrow | Mar. 14, 1950 |
| 2,503,472 | Chilowsky | Apr. 11, 1950 |
| 2,561,670 | Miller et al. | July 24, 1951 |
| 2,627,160 | MacDonald | Feb. 3, 1953 |
| 2,637,161 | Tschinkel | May 5, 1953 |
| 2,648,190 | Maisner | Aug. 11, 1953 |